(12) United States Patent
Fajardo

(10) Patent No.: US 7,019,928 B2
(45) Date of Patent: Mar. 28, 2006

(54) MULTI-PORTED MASS STORAGE DEVICE

(75) Inventor: Pedro E. Fajardo, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 537 days.

(21) Appl. No.: 09/900,823

(22) Filed: Jul. 6, 2001

(65) Prior Publication Data

US 2003/0007274 A1    Jan. 9, 2003

(51) Int. Cl.
*G11B 5/02* (2006.01)
*G11B 19/02* (2006.01)
*G06F 1/16* (2006.01)

(52) U.S. Cl. .................. 360/55; 360/69; 361/686; 710/303; 369/30.24; 369/30.36

(58) Field of Classification Search .................. 360/15, 360/55, 72.2, 49, 48, 47; 369/84, 85; 707/204; 710/8, 13, 74, 7; 708/140, 139; 711/111, 711/112, 1; 361/600, 728, 683, 684, 685
See application file for complete search history.

(56) References Cited

U.S. PATENT DOCUMENTS

| 5,724,274 | A | * | 3/1998 | Nelson et al. | 361/683 |
|---|---|---|---|---|---|
| 6,018,775 | A | * | 1/2000 | Vossler | 710/1 |
| 6,633,445 | B1 | * | 10/2003 | Wilke | 360/55 |
| 2003/0007274 | A1 | * | 1/2003 | Fajardo | 360/55 |

OTHER PUBLICATIONS

David Coursey, Learn my trick for hassle free file tranfers from PC to PC. WWW.zdnet.com/anchordesk/stories/story/010738_2696362_00_html. 3 Pgs.
Laplink, The Fast and Easy Utility for File Transfer & Migration. www.laplink.com/products/pcsync/overview.asp, 2 pgs.

* cited by examiner

*Primary Examiner*—Andrew L. Sniezek
(74) *Attorney, Agent, or Firm*—Howard A. Skaist

(57) ABSTRACT

The present disclosure relates to mass storage devices and, more particularly, to transferring data between mass storage devices.

13 Claims, 2 Drawing Sheets

Mounted

Unmounted

Fig 1a: Unconnected

Fig 1b: Mounted

Fig 1c: Unmounted

Fig 2a: Unconnected

Fig 2b: Mounted

Fig 2c: Unmounted

MULTI-PORTED MASS STORAGE DEVICE

BACKGROUND

1. Field

The present disclosure relates to mass storage devices and, more particularly, to transferring digital data between mass storage devices.

2. Background Information

Hard disk drives (HDDs) or hard drives are one example of a fixed storage medium. Hard drives, which are typically used with computers, digital video recorders and other information handling systems which process information in a digital format, are typically designed to be operated in either one of two modes for the useful life of the drive. In this context, the terms "digital data" and "digital format" refer to data represented in discrete, discontinuous form, as contrasted with analog data represented in a continuous form. Digital data usually implies the use of binary digits; however, the term digital data is not limited to binary digits and may, for example, utilize any radix. In one mode, these drives may be encased within their own chassis and coupled to an external computer or information handling system. In the other, more typical, mode, the bare drive is mounted internally within the chassis of the computer or information system. These hard drives are typically designed to operate in one of these two modes, as previously indicated. As a result, it may be difficult to externally use a drive, designed for internal use, and vice versa.

Often, during the useful lifetime of the information handling system, the user may desire more storage capacity than the system currently provides. One of the ways a user may then increase this storage capacity is by replacing the current internal hard drive, which may be often nearly filled to capacity, with a larger internal hard drive. However, the user may also or alternatively have other reasons to replace the current hard drive, such as, for example, a fear that the current hard drive may cease to operate correctly, or a replacement hard drive may have more desirable design features.

If a user chooses to replace a system's internal hard drive, the user may wish to retain the information stored upon the current internal hard drive. Internal hard drives are typically designed to work only within the chassis of an information system. Therefore, it may be desirable to transfer the digital data when both the current and the replacement drives are mounted within the system.

Therefore, a user may often go through an involved process to accomplish the drive replacement. Typically, a user will proceed through the following: turn off the power to the information handling system and unplug the system's power supply; unscrew and remove the cover of the system; determine, and, if appropriate, clear space for, which may involve the temporary removal and reinstallation of the system's other drives or components, the mounting point for the replacement hard drive; place the replacement drive at the mount point and fixedly mount the replacement drive; couple the replacement drive to the information handling system's power distribution network and information buses; at the user's discretion, reseal the cover to the information system; reattach the system to its power supply; turn on the system; make sure there are not any significant communication errors regarding the replacement drive or any current drives; format the replacement drive so that information may be stored on it; copy the information from the system's current hard drive to the installed replacement hard drive; turn the system off and decouple it from its power supply; if the cover was resealed, remove the cover; decouple the current hard drive from the system's power distribution network and information bus; unmount and remove the current hard drive from the system; reinstall any other drives that were temporarily decoupled; reseal the cover to the information handling system; reattach the system to its power supply; turn on the system; and make sure there are not any significant communication errors regarding the replacement drive or any remaining current drives. This is a long and lengthy process, which often involves the use of special tools, cables or other supplies. A need, therefore, exists for an improved mass storage device or technique for transferring data.

BRIEF DESCRIPTION OF THE DRAWINGS

Subject matter is particularly pointed out and distinctly claimed in the concluding portions of the specification. The claimed subject matter, however, both as to organization and the method of operation, together with objects, features and advantages thereof, may be best understood by a reference to the following detailed description when read with the accompanying drawings in which:

FIG. 1a is a block diagram illustrating an embodiment of a mass storage device in an unconnected state;

FIG. 1b is a block diagram illustrating an embodiment of a mass storage device in a mounted state;

FIG. 1c is a block diagram illustrating an embodiment of a mass storage device in an unmounted state;

FIG. 2a is a block diagram illustrating an embodiment of a cradle to transfer digital data between mass storage devices in an unconnected state;

FIG. 2b is a block diagram illustrating an embodiment of a cradle to transfer digital data between mass storage devices in a mounted state;

FIG. 2c is a block diagram illustrating an embodiment of a cradle to transfer digital data between mass storage devices in an unmounted state.

DETAILED DESCRIPTION

Figure 1:
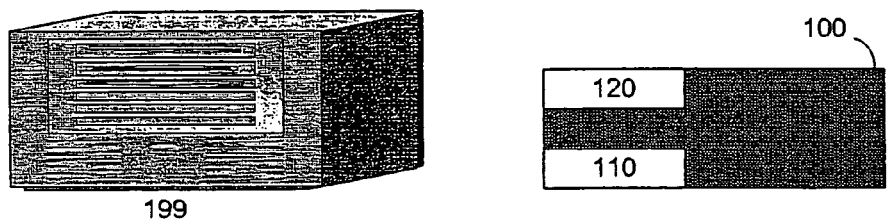
FIG. 1 is a block diagram illustrating an embodiment of a mass storage device.
Figure 1:
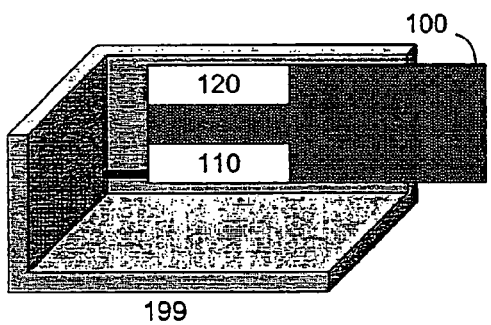
Figure 1:
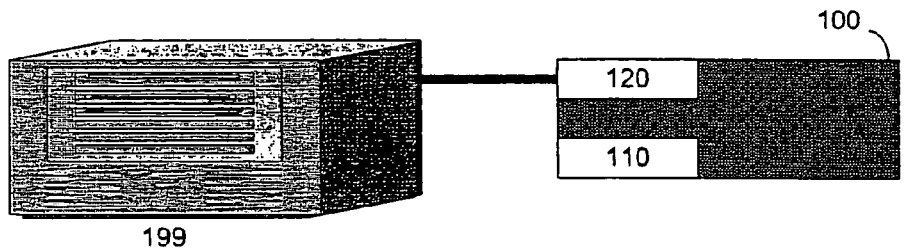

In the following detailed description, numerous details are set forth in order to provide a thorough understanding of the claimed subject matter. However, it will be understood by those skilled in the art that the claimed subject matter may be practiced without these specific details. In other instances, well-known methods, procedures, components, and circuits have not been described in detail so as to not obscure the claimed subject matter.

In this context, a mass storage device, such as, for example a hard drive, may include a component comprising a sealed housing, allowing the storage of a large amount of digital data. One possible example of a mass storage device comprises a hard drive (also frequently referred to as a "hard disk") which often comprises a rigid disk or set of disks (also known as platters) of magnetic or magnetically coated material, which may rotate in the sealed housing and is frequently used in computers and other information handling systems. Hard drives are typically designed with one data interface. In order to increase the data throughput of the hard drive, among other reasons, this data interface typically transfers data in a parallel fashion and is designed to be operated when the hard drive is mounted substantially internally within an information handling system. However, a hard drive is merely an example of a mass storage device and, therefore, the broad definition of mass storage device is not limited to the hard drive example. Other examples, but not an exhaustive list, of mass storage devices may be, for example, a removable drive, such as, for example, the Iomega Click drive, a flash memory card or stick, or an optical drive; however, other devices may also be considered mass storage devices.

In addition, an information handling system comprises a system, which is capable of accepting and at least possibly manipulating information, possibly in a variety of formats and modes, and in part stores digital data on a mass storage device. A few, but not all, examples of an information handling system include computers, digital video recorders which may, as one possibility, accept analog video signals and store them in a digital format, or digital audio devices which may receive audio information via, for example, removable media or possibly a network connection, and store the audio information on the mass storage device. Of course, one skilled in the art will understand that other examples of information handling systems are possible.

During the useful life of an information handling system, the user may desire more storage capacity than the system currently provides. One of the ways a user may then increase this storage capacity is by replacing the current mass storage device, in this example a fixedly mounted hard drive, which is often nearly filled to capacity, with a larger fixedly mounted hard drive. However, the user may have alternate or additional reasons to replace the current hard drive, such as, for example, a fear that the drive may soon cease to operate correctly, or the replacement hard drive may have additional desirable features.

If a user chooses to replace a system's fixedly mounted hard drive, the user may wish to retain the information stored upon the current fixedly mounted hard drive. Fixedly mounted hard drives are typically designed to work within the chassis of an information handling system. Therefore, it may be desirable to transfer the data on the current drive when both the current and replacement drives are mounted within the system. However, this process can be inefficient at times. A technique which includes installing both drives in the system at the same time may lead to the system being opened and sealed at least twice, and the replacement drive being installed at least twice, once in a "temporary" and once in the desired "permanent" location. The technique may also result in power cycling and configuring the system multiple times as the replacement drive is installed and re-installed.

The often arduous technique of temporarily installing both mass storage devices in a single information handling system at the same time has been the dominant technique for transferring digital data between a current and replacement mass storage device for the common user during the last 15 years. Devices and techniques have been developed which allow the transfer of digital data between mass storage devices, which are installed in at least two different information handling systems. Examples of such techniques include, but are not limited to, the use of a local area network, or the use of software and a direct cable connection to transfer digital data from the current drive, installed in a first information handling system, to a third drive, installed in a second information handling system, and then back to the replacement drive, after it is installed in the first information handling system. A disadvantage of the techniques which comprise two or more information handling systems to transfer digital data between a current and replacement mass storage device is the cost of the second information system and any cabling or networking which may be utilized to accomplish the technique.

However, the process of transferring digital data between a current and replacement storage device utilizing a single information handling system has typically relied upon either the temporary concurrent installation of both the current and replacement drives as described above, or the use of at least a third mounted or removable drive to temporarily house the digital data between the removal of the current drive and the installation of the replacement drive. The disadvantages of the known techniques which comprise a single information handling system is the inefficiency resulting from the concurrent installation of both the current and replacement devices and the additional cost of techniques which may utilize a third mass storage device.

An embodiment of a mass storage device is illustrated in FIG. 1. Mass storage device 100, which may comprise, for example, a hard drive, may have two data ports, 110 and 120. Data port 110 may be designed to be used when the device is operated while fixedly mounted to information handling system 199 or operated substantially within a cradle that is fixedly mounted within information handling system 199, which may be a system such as, for example, a computer.

Data port 110 may utilize a protocol or interface which transfers data in a parallel fashion, such as, for example, the Integrated Device Electronics/AT Attachment (IDE/ATA) interface or any of the propriety interfaces based upon IDE (hereafter "Enhanced IDE" or "EIDE"). *AT Attachment Interface for Disk Drives*, ANSI Std. X3.221-1999. Or, as another example, the *Small Computer System Interface-2*, ANSI Std. X3.131-1999 (hereafter "SCSI"). However, the claimed subject matter is, of course, not limited to any particular standard or specification.

Data port 120 may be designed to be utilized when device 100 is operated while not mounted to system 199. Data port 120 may comprise a parallel protocol or interface, such as, for example the IEEE 1284 specification (hereafter "the parallel printer port protocol or interface"). *Standard Signaling Method for a Bi-Directional Parallel Peripheral Interface for Personal Computers*, IEEE Std. 1284-1994. Or, alternatively, data port 120 may utilize a serial protocol or interface, such as, for example, the IEEE 1394 specification (hereafter "Firewire"). *IEEE Standard for a High Performance Serial Bus*, IEEE Std 1394a-2000. Or, as another example, a wireless serial protocol or interface. For example, a short-range, under approximately a 500-foot radius, wireless serial protocol or interface, such as, for example, Bluetooth, may be used. Bluetooth Special Interest Group, *Specification of the Bluetooth System: Core*, (ver. 1.1 2001). In addition, via data port 120 operating power may be provided to mass storage device 100 when the device is operated while not mounted to information system 199. However, the claimed subject matter is, of course, not limited to any particular standard or specification.

As a specific example of this embodiment, although of course the claimed subject matter is not limited to, a user may own a computer with a hard drive complying with this embodiment. While the hard drive is fixedly mounted with the computer, the user may utilize data port 110 to read and write data to and from the hard drive. If the user wished to replace the original hard drive with a replacement drive, the user would not need to install both drives in the computer at the same time. The user might remove the original drive and install the replacement drive without transferring any information during the installation process. Then, the user could couple the unmounted original drive, to the computer via data port 120 and transfer information to the installed replacement drive. However, this is merely one of many possible examples of an embodiment.

Figure 2:
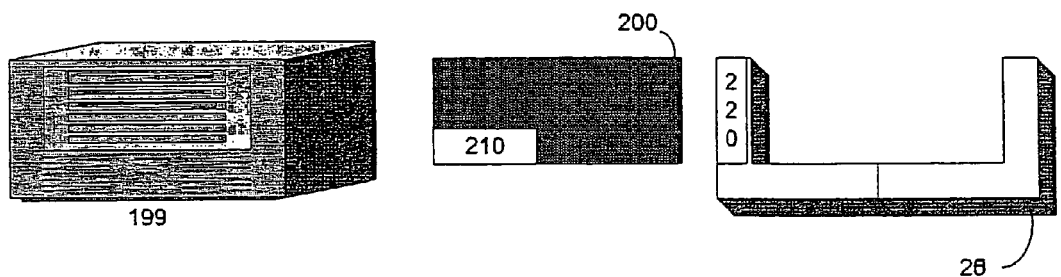
FIG. 2 is a block diagram illustrating an embodiment of a cradle to transfer digital data between mass storage devices.
Figure 2:
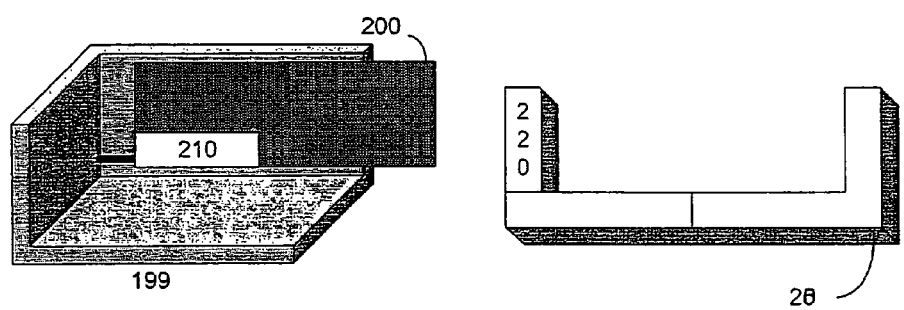
Figure 2:
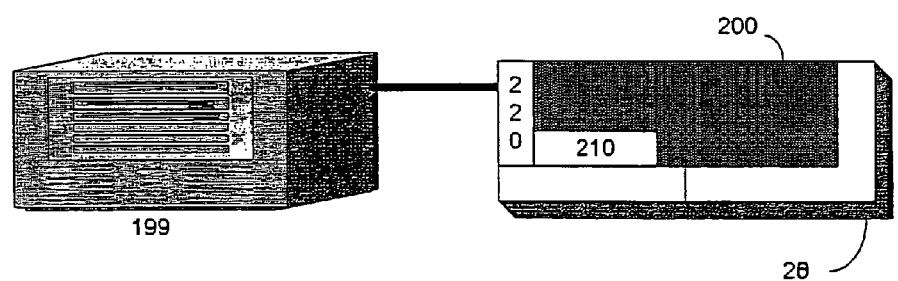

Another embodiment comprising a cradle is illustrated in FIG. 2. Mass storage device 200, such as, for example, a hard disk drive, may include only data port 210, which is designed to be utilized when mass storage device 200 is fixedly mounted to information handling system 199. When device 200 is operated externally from information handling system 199, it may be placed in cradle 250. Cradle 250 may transfer digital data from the mass storage device's data port 210 to the cradle's data port 220. Data port 220 may be used to transfer the aforementioned digital data to information handling system 199.

Like the aforementioned embodiment, data port 210 may transfer digital data utilize a parallel protocol or interface, such as, for example, the Enhanced Integrated Device Electronics (EIDE) interface or, as another example, the Small Computer System Interface (SCSI). Again, the claimed subject matter is, of course, not limited to any particular standard or specification.

Data port 220 may be intended to be utilized when device 200 is operated in an unmounted fashion to system 199. Data port 220 may comprise a parallel protocol or interface, such as, for example the parallel printer port protocol or interface. Or, alternatively, data port 220 may comprise a serial protocol or interface, such as, for example, the Universal Serial Bus (USB) interface. Compaq, et. al, *Universal Serial Bus Specification*, (rev. 2.0, 2000), or, as another example, a wireless serial protocol or interface. For example, a short-range, under approximately a 500-foot radius, wireless serial protocol or interface, such as, for example, Bluetooth may be used. However, the claimed subject matter is, of course, not limited to any particular standard or specification. In addition, cradle 250 may provide operating power to mass storage device 200.

As a specific example of this embodiment, which the claimed subject matter is not limited to, a user may have a computer with a hard drive complying with this embodiment. While the hard drive is fixedly mounted with the computer, the user may utilize data port 210 to read and write data to and from the hard drive. If the user wished to replace the original hard drive with a replacement drive, the user would not need to install both drives in the computer at the same time. The user might remove the original drive and install the replacement drive without transferring any information during the installation process. Then, the user could couple the unmounted original drive with cradle 250. Cradle 250 may then be coupled with the computer via data port 220. Information may then be transferred via this data path to the installed replacement drive. However, this is merely one of many possible examples of an embodiment.

In another embodiment, either of the aforementioned techniques may be used but, in addition, instructions stored within or processed by the information handling system may allow the user to select or mark which pieces of information or digital data are to be transferred from the current mass storage device to the replacement mass storage device. This information may be stored in a lookup table or an indexing system. These instructions may facilitate the ability for the digital data to be transferred automatically once the current mass storage device is coupled to the information handling system via either data port 120 or cradle 250. Or, alternately in an additional embodiment, data port 120 or cradle 250 may be adapted so that the user may operate the information handling system to read from and write to the current mass storage device regardless of whether the current mass storage device is operated in either a mounted or an unmounted fashion.

While certain features of the claimed subject matter have been illustrated and described herein, many modifications, substitutions, changes, and equivalents will now occur to those skilled in the art. It is, therefore, to be understood that the appended claims are intended to cover all such modifications and changes that fall within the true spirit of the claimed subject matter.

What is claimed is:

1. A method for transferring digital data comprising:
   removing a first mass storage device from an information handling system;
   reading at least a portion of digital data from said first mass storage device while said first mass storage device is operated with said information handling system while said first mass storage device is unmounted; and
   storing said digital data read from said first mass storage device to a second mass storage device mounted with said information handling system;
   wherein said first mass storage device includes:
      a first data port, said first data port having a configuration so as to be utilized when said first mass storage device is operated while mounted with said information system, and
      a second data port, said second data port having a configuration so as to be utilized when said first mass storage device is operated with said information system while said first mass storage device is unmounted.

2. The method of claim 1, which further comprises, prior to removing a first mass storage device from an information handling system, storing said digital data to said first mass storage device while said first mass storage device is substantially mounted with said information handling system.

3. The method of claim 1, wherein reading at least a portion of digital data from said first mass storage device includes determining the at least a portion of said digital data to read from said first mass storage device.

4. The method of claim 3, wherein determining the at least a portion of said digital data to read from said first mass storage device comprises marking the at least a portion of said digital data before said first mass storage device is removed from said information system.

5. The method of claim 4, wherein said marking of the at least a portion of said digital data comprises utilizing an indexing system.

6. The method of claim 1, wherein reading at least a portion of digital data from said first mass storage device comprises placing said first mass storage device in a cradle after removing said first mass storage device from said information handling system.

7. The method of claim 6, wherein said reading at least a portion of said digital data from said first mass storage device comprises transmitting the at least a portion said digital data from said first mass storage device to said information handling system in a serial fashion.

8. The method of claim 7, wherein said method further comprises storing digital data in said first mass storage device in a parallel fashion, before removing said first mass storage device from said information handling system.

9. The method of claim 1, wherein said method further comprises mounting said second mass storage device with said information platform after said first mass storage device has been removed.

10. An apparatus comprising:
a mass storage device having a configuration so as to be used in conjunction with a system which includes the capability to at least in part store digital data;
said mass storage device including:
a first data port, and
a second data port; and
wherein said mass storage device
utilizes, during operation, said first data port when said mass storage device is operated while mounted with said system and arranged to
utilizes, during operation, said second data port when said mass storage device is operated with said system while said mass storage device is unmounted.

11. The apparatus of claim 10, wherein said second data port of said mass storage device is arranged to be coupled, during operation, to another mass storage device, which is substantially mounted with said system.

12. The apparatus of claim 11, wherein said second data port further has the capability to both transmit and receive digital data from said system.

13. The apparatus of claim 10, wherein said mass storage, when operated with said system while said mass storage device is unmounted, transmits digital data from said mass storage device utilizing said second data port.

* * * * *

UNITED STATES PATENT AND TRADEMARK OFFICE
CERTIFICATE OF CORRECTION

| | | |
|---|---|---|
| PATENT NO. | : 7,019,928 B2 | Page 1 of 1 |
| APPLICATION NO. | : 09/900823 | |
| DATED | : March 28, 2006 | |
| INVENTOR(S) | : Fajardo | |

It is certified that error appears in the above-identified patent and that said Letters Patent is hereby corrected as shown below:

In column 7, at line 8, after "device" insert --is capable of--.

In column 7, at line 9, delete "utilizes" and insert --principally utilizing,--.

In column 7, at line 12, delete "utilizes" and insert --principally utilizing,--.

Signed and Sealed this

Thirtieth Day of October, 2007

JON W. DUDAS
*Director of the United States Patent and Trademark Office*